(12) United States Patent
Shishido et al.

(10) Patent No.: US 9,594,295 B2
(45) Date of Patent: Mar. 14, 2017

(54) PROJECTOR WITH A LIGHT MODULATOR CONTROLLED BASED ON A VIEWING ANGLE CHARACTERISTIC OF THE LIGHT MODULATOR

(71) Applicant: SEIKO EPSON CORPORATION, Tokyo (JP)

(72) Inventors: Yoichi Shishido, Matsumoto (JP); Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 46 days.

(21) Appl. No.: 14/664,181

(22) Filed: Mar. 20, 2015

(65) Prior Publication Data

US 2015/0277212 A1    Oct. 1, 2015

(30) Foreign Application Priority Data

Mar. 26, 2014  (JP) ................................. 2014-063239
Mar. 26, 2014  (JP) ................................. 2014-063240

(51) Int. Cl.
*G03B 21/20*    (2006.01)
*H04N 9/31*    (2006.01)
*G03B 21/00*    (2006.01)

(52) U.S. Cl.
CPC ....... *G03B 21/2013* (2013.01); *G03B 21/006* (2013.01); *G03B 21/202* (2013.01);
(Continued)

(58) Field of Classification Search
CPC .............. G03B 21/2013; G03B 21/202; G03B 21/2053; G03B 21/006; G03B 21/2026;
(Continued)

(56) References Cited

U.S. PATENT DOCUMENTS 6,755,538 B2 *  6/2004  Sugawara ............ G03B 21/006
                                                        353/97
6,803,971 B2 * 10/2004  Yamamoto ........... H04N 9/3105
                                                        348/745

(Continued)

FOREIGN PATENT DOCUMENTS

CN        101467490 A    6/2009
JP        2001-359025 A   12/2001
(Continued)

*Primary Examiner* — Bao-Luan Le
(74) *Attorney, Agent, or Firm* — Oliff PLC

(57) ABSTRACT

A projector includes a plurality of light sources, a light modulator that modulates light fluxes emitted from the plurality of light sources based on input information, a projection system that projects modulated light fluxes from the light modulator, a light guiding system that has different areas on which the plurality of light fluxes emitted from the plurality of light sources are incident and guides the plurality of incident light fluxes to the light modulator, a lighting state detector that detects lighting states of the plurality of light sources, and a controller that corrects the input information with correction information based on a viewing angle characteristic of the light modulator in accordance with the lighting states of the plurality of light sources detected by the lighting state detector.

10 Claims, 10 Drawing Sheets

(52) U.S. Cl.
CPC ....... *G03B 21/208* (2013.01); *G03B 21/2053* (2013.01); *G03B 21/2066* (2013.01); *H04N 9/315* (2013.01); *H04N 9/3152* (2013.01); *H04N 9/3155* (2013.01); *H04N 9/3164* (2013.01)

(58) Field of Classification Search
CPC .............. G03B 21/2066; G03B 21/208; H04N 9/3164; H04N 9/315; H04N 9/3152; H04N 9/3155
See application file for complete search history.

(56) References Cited

U.S. PATENT DOCUMENTS

| | | | | |
|---|---|---|---|---|
| 8,242,425 | B2* | 8/2012 | Matsumoto | G03B 21/2053 250/205 |
| 8,585,214 | B2* | 11/2013 | Kotani | G03B 21/2013 353/119 |
| 9,088,732 | B2* | 7/2015 | Kotani | G03B 21/2013 |
| 2002/0033904 | A1* | 3/2002 | Yamamoto | H04N 9/3105 348/760 |
| 2003/0193650 | A1* | 10/2003 | Sugawara | G03B 21/006 353/31 |
| 2007/0285378 | A1 | 12/2007 | Lankhorst et al. | |
| 2008/0259284 | A1* | 10/2008 | Maeda | G02B 27/1046 353/31 |
| 2009/0027575 | A1* | 1/2009 | Miyauchi | G09G 3/002 349/5 |
| 2009/0141252 | A1* | 6/2009 | Kamijima | H04N 9/3129 353/85 |
| 2010/0117539 | A1* | 5/2010 | Kotani | G03B 21/206 315/90 |
| 2010/0208212 | A1* | 8/2010 | Matsumoto | G03B 21/2013 353/31 |
| 2011/0261272 | A1* | 10/2011 | Kotani | G02B 27/1046 348/789 |
| 2011/0279780 | A1* | 11/2011 | Saitou | G03B 21/28 353/20 |
| 2012/0050351 | A1* | 3/2012 | Dobler | G09G 3/3406 345/690 |
| 2012/0050624 | A1* | 3/2012 | Kotani | G03B 21/2013 348/789 |
| 2013/0258291 | A1* | 10/2013 | Kotani | G03B 21/2013 353/30 |

FOREIGN PATENT DOCUMENTS

| | | |
|---|---|---|
| JP | 2002-101423 A | 4/2002 |
| JP | 2003-302618 A | 10/2003 |
| JP | 2008-076802 A | 4/2008 |
| JP | 2010-190938 A | 9/2010 |

* cited by examiner

PROJECTOR WITH A LIGHT MODULATOR CONTROLLED BASED ON A VIEWING ANGLE CHARACTERISTIC OF THE LIGHT MODULATOR

BACKGROUND

1. Technical Field

The present invention relates to a projector.

2. Related Art

For example, JP-A-2001-359025 discloses a projector including two light source lamps in order to display a bright image, prolong the life of the light source, and achieve other purposes.

JP-A-2001-359025 describes that using the light source lamps one after the other doubles the period before the light source lamp is exchanged and turning the two light source lamps and using them as required readily achieves a high-luminance image.

In a projector including a plurality of light sources, however, it is conceivable that part of the plurality of light sources reaches its life, becomes defective, or otherwise fails to emit light and therefore only the remaining light sources emit light. It is also conceivable that only part of the plurality of light sources is intentionally caused to emit light, for example, to increase the life of the entire light source as described above. In these cases, not only does the brightness of an image decreases as a whole, but also color unevenness and brightness unevenness occur.

SUMMARY

An advantage of some aspect of the invention is to provide a projector capable of suppressing color unevenness and brightness unevenness even in a state in which only part of a plurality of light sources is light-on state.

A projector according to an aspect of the invention includes a plurality of light sources, a light modulator that modulates light fluxes emitted from the plurality of light sources based on input information, a projection system that projects modulated light fluxes from the light modulator, a light guiding system that has different areas on which the plurality of light fluxes emitted from the plurality of light sources are incident and guides the plurality of incident light fluxes to the light modulator, a lighting state detector that detects lighting states of the plurality of light sources, and a controller that corrects the input information with correction information based on a viewing angle characteristic of the light modulator in accordance with the lighting states of the plurality of light sources detected by the lighting state detector.

A reason why color unevenness and brightness unevenness occur when only part of a plurality of light sources emits light is speculated as follows.

That is, in a projector including a plurality of light sources, a plurality of light fluxes emitted from the plurality of light sources disposed in positions different from each other are guided to a light modulator through a light guiding system and superimposed on each other. In the configuration in which the light sources are disposed in different positions, the angles of incidence of the light fluxes incident on the light modulator also differ from each other. Further, a light modulator typically has an asymmetric viewing angle characteristic in many cases. The gamma characteristic or the contrast characteristic of the light modulator therefore varies in accordance with the lighting states of the plurality of light sources, resulting in the problem of occurrence of color unevenness and illuminance unevenness.

In contrast, in the projector according to the aspect of the invention, the controller corrects the input information by using correction information based on the viewing angle characteristic of the light modulator in accordance with the lighting states of the plurality of light sources that are detected by the lighting state detector. As a result, even when only part of the plurality of light sources emits light, the projector achieved in the aspect of the invention can suppress the color unevenness and the illuminance unevenness.

In the projector according to the aspect of the invention, the plurality of light sources may include a first light source that emits light incident on the light modulator in an azimuth angle direction corresponding to a distinct vision direction in the viewing angle characteristic and a second light source that emits light incident on the light modulator in an azimuth angle direction corresponding to an inverse distinct vision direction in the viewing angle characteristic, and the correction information may include first correction information in a case where the first light source is light-on state and second correction information in a case where the second light source is light-on state.

According to the configuration described above, correction information including correction information for a light source that greatly affects the viewing angle characteristic, that is, correction information in a case where the first light source, which corresponds to the distinct vision direction in the viewing angle characteristic, is light-on state and correction information in a case where the second light source, which corresponds to the inverse distinct vision direction in the viewing angle characteristic, is light-on state can be used to effectively perform the correction.

In the projector according to the aspect of the invention, the controller may perform the correction on the input information with one of the first correction information and the second correction information when one of the first light source and the second light source is light-on state.

According to the configuration described above, when the first light source or the second light source is light-on state, the first correction information or the second correction information is used to correct the input information, whereby the correction can be performed appropriately.

In the projector according to the aspect of the invention, each of the first correction information and the second correction information may be correction information based on at least one of correction information in a case where only the first light source is light-on state and correction information in a case where only the second light source is light-on state.

According to the configuration described above, the amount of acquisition of the correction information can be reduced, whereby the burden on the controller can be reduced.

In the projector according to the aspect of the invention, the correction of the input information may be gamma correction of the input information.

In the projector according to the aspect of the invention, the correction information may include correction information in a case where among the plurality of light sources, a light source that emits light incident in an azimuth angle direction corresponding to an inverse distinct vision direction in the viewing angle characteristic is light-on state.

According to the configuration described above, correction information in a case where a light source that emits light incident in an azimuth angle direction corresponding to the inverse distinct vision direction is light-on state can be used to perform appropriate contrast correction.

In the projector according to the aspect of the invention, the light modulator may be formed of a plurality of light modulators that modulate a plurality of color light fluxes having colors different from each other, and the controller may perform the correction on the input information such that among the plurality of color light fluxes, the amount of leakage light of a color light flux having a relatively small amount of leakage light in a black display mode approaches the amount of leakage light of a color light flux having a relatively large amount of leakage light in the black display mode.

According to the configuration described above, color unevenness, in particular, can be reliably suppressed.

In the projector according to the aspect of the invention, the correction of the input information may be contrast correction of the input information.

In the projector according to the aspect of the invention, the light modulator may be a liquid crystal light valve.

When the light modulator is a liquid crystal light valve, the viewing angle characteristic thereof has a distinct vision direction and an inverse distinct vision direction in accordance with the mode of the liquid crystal layer (direction in which liquid crystal molecules are inclined). In this case, among the plurality of light sources, a light source that emits light incident in an azimuth angle direction corresponding to the inverse distinct vision direction in the viewing angle characteristics can be particularly taken into consideration for correction of input information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Desirable Aspects

First Embodiment

A first embodiment of the invention will be described below with reference to FIGS. 1 to 10.

In the present embodiment, a projector including four light sources and using a liquid crystal light valve as a light modulator or what is called a four-light-source liquid crystal projector is presented by way of example.

Figure 1:
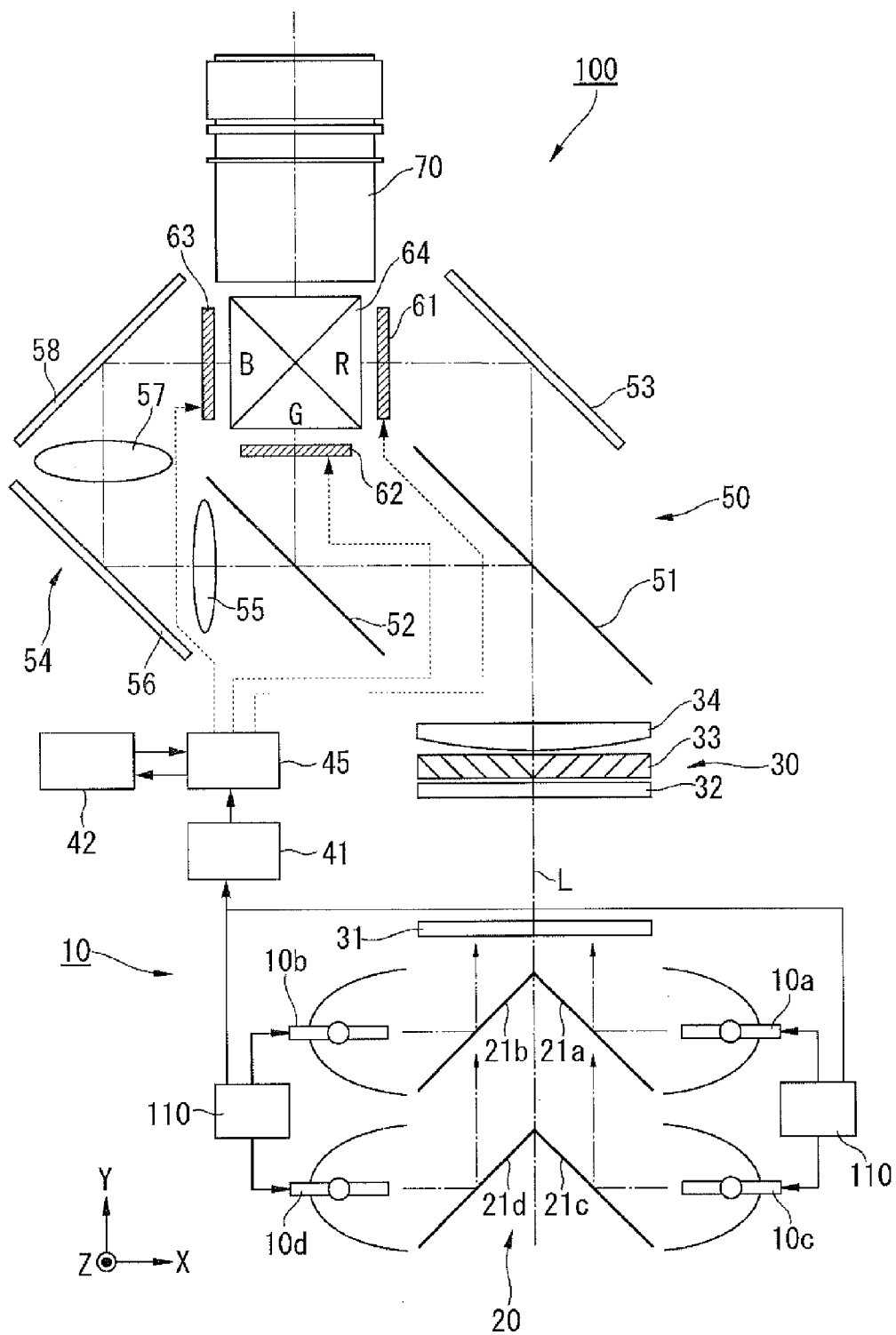
FIG. 1 is a schematic configuration diagram showing a projector according to an embodiment of the invention.

FIG. 1 is a schematic configuration diagram showing the projector according to the present embodiment.

In the following drawings, to show each component in an easily viewable manner, the scales of the dimensions of some of the components may differ from actual scales.

A projector 100 according to the present embodiment is a three-panel liquid crystal projector including transmissive liquid crystal light valves corresponding to different colors of R (red), G (green), and B (blue), as shown in FIG. 1. The projector 100 includes four light sources 10a, 10b, 10c, and 10d, a light guiding system 20, an optical integration system 30, a lighting state detector 41, a storage section 42, a controller 45, a color separation system 50, liquid crystal light valves (light modulators) 61, 62, and 63, a cross dichroic prism 64, and a projection system 70. In the present embodiment, the light sources 10a to 10d, the light guiding system 20, and the optical integration system 30 form an illuminator 10.

Each of the light sources 10a, 10b, 10c, and 10d includes a lamp, such as an ultrahigh-pressure mercury lamp, a metal halide lamp, or a xenon lamp, and a reflector that reflects light from the lamp. Light source controllers 110, which drive and control the light sources 10a, 10b, 10c, and 10d, are connected to the light sources.

The light guiding system 20 includes four mirrors 21a, 21b, 21c, and 21d. The light guiding system 20 causes light fluxes emitted from the light sources 10a, 10b, 10c, and 10d to be incident on different positions of a first optical integration lens 31, which will be described later, and guides the light fluxes to the liquid crystal light valves 61, 62, and 63.

The optical integration system 30 is an optical system for uniformly illuminating the liquid crystal light valves 61, 62, and 63 with the light fluxes from the light sources 10a, 10b, 10c, and 10d. The optical integration system 30 has a first optical integration lens 31, a second optical integration lens 32, a polarization conversion element 33, and a superimposing lens 34 sequentially arranged from the side where the light guiding system 20 is present.

Figure 2A:
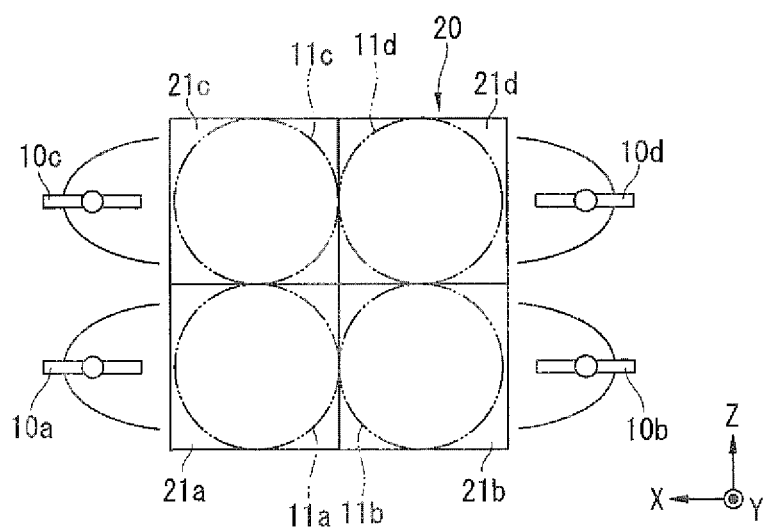
FIG. 2A describes the configuration of a light guiding system and an effect thereof.
Figure 2B:
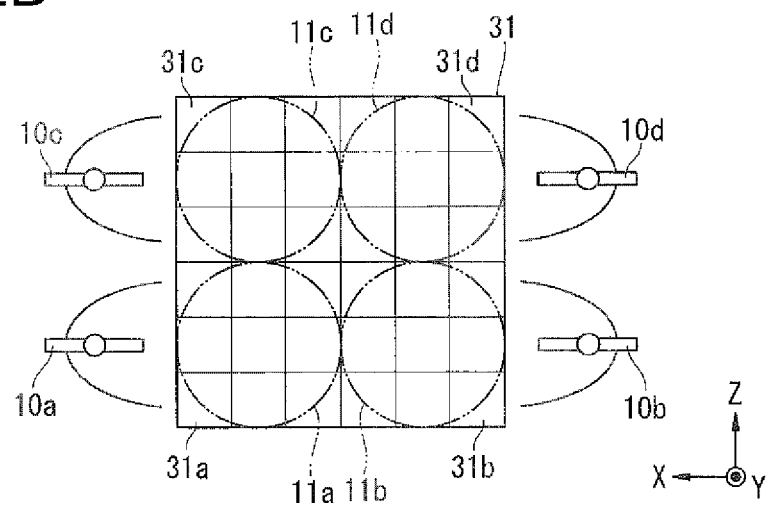
FIG. 2B describes the configuration of the light guiding system and the effect thereof.

FIG. 2A shows the light sources 10a, 10b, 10c, and 10d and the light guiding system 20 viewed from the side where the first optical integration lens 31 is present (in −Y direction). FIG. 2B describes an effect of the light guiding system 20 and shows the first optical integration lens 31 viewed from the side where the second optical integration lens 32 is present (in −Y direction).

As shown in FIGS. 1 and 2A, the light sources 10a and 10b are so disposed that they face each other along the light emission direction (X-axis direction in FIGS. 1 and 2A). The mirror 21a is disposed in front of the light source 10a, and the mirror 21b is disposed in front of the light source 10b. The mirrors 21a and 21b are so disposed that they are inclined by 45° to the light emission direction (X-axis direction) so that the light fluxes from the light sources 10a and 10b are deflected toward the first optical integration lens 31.

The light sources 10c and 10d are so disposed that they face each other along the light emission direction. The mirror 21c is disposed in front of the light source 10c, and the mirror 21d is disposed in front of the light source 10d. The mirrors 21c and 21d are so disposed that they are inclined by 45° to the light emission direction (X-axis direction) so that the light fluxes from the light sources 10c and 10d are deflected toward the first optical integration lens 31.

In the present embodiment, the light sources 10a to 10d are grouped into two and disposed in two tiers or upper and lower tiers (arranged in Z-axis direction), as shown in FIG. 2A. The light sources 10c and 10d and the mirrors 21c and 21d are disposed in the upper tier (on +Z side). The light sources 10a and 10b and the mirrors 21a and 21b are disposed in the lower tier (on −Z side). In the present embodiment, the light sources 10a and 10b and the mirrors 21a and 21b in the lower tier are provided in a portion closer to the first optical integration lens 31 than the light sources 10c and 10d and the mirrors 21c and 21d in the upper tier, as shown in FIG. 1.

In the light guiding system 20 having the configuration described above, light fluxes 11a, 11b, 11c, and 11d emitted from the light sources 10a to 10d are reflected off the corresponding mirrors 21a, 21b, 21c, and 21d and deflected toward the side where the first optical integration lens 31 is disposed, as shown in FIG. 2B. The light fluxes 11a to 11d deflected by the mirrors 21a to 21d are incident on different sub-areas of the first optical integration lens 31. Specifically, the light fluxes 11a to 11d are incident on four sub-areas 31a to 31d, which are portions of the first optical integration lens 31 halved horizontally and vertically (in Z-axis and X-axis directions). In the present embodiment, the entire area of the first optical integration lens 31 is irradiated with the four light fluxes 11a to 11d.

In the present embodiment, the first optical integration lens 31 shown in FIG. 2B is formed of a fly's eye lens having lenslets (lens elements) arranged in the row and column directions in a 6-row, 6-column matrix. Each of the sub-areas 31a to 31d is formed of a group of lenslets arranged in 3 rows and 3 columns. In the present embodiment, the description will be made of a case where the first optical integration lens 31 is formed of a group of lenslets arranged in 6 rows and 6 columns, but the first optical integration lens 31 actually has a greater number of lenslets than those in the 6 rows and 6 columns. The size of the first optical integration lens 31, that is, the number of arranged lenslets is determined in accordance with the size of each of the light fluxes 11a to 11d emitted from the light sources 10a to 10d.

The light fluxes having exited out of the lens elements of the first optical integration lens 31 pass through the second optical integration lens 32 and the superimposing lens 34 and are superimposed on one another on the liquid crystal light valves 61 to 63.

Instead, only the second optical integration lens 32 may function as the superimposing lens. In this case, the superimposing lens 34 may not be provided.

The polarization conversion element 33 is provided between the second optical integration lens 32 and the superimposing lens 34. The polarization conversion element 33 is formed, for example, of a polarizing beam splitter array (PBS array). The polarization conversion element 33 aligns the polarization directions of the light fluxes having exited out of the second optical integration lens 32 with each other and outputs linearly polarized light fluxes having a single polarization direction. The polarization conversion element 33 has a structure in which substantially rod-shaped prism elements each having a polarization separation film, a reflection film, and a retardation film are periodically arranged in the width direction of the polarization conversion element 33 (X-axis direction).

The color separation system 50 includes a first dichroic mirror 51, a second dichroic mirror 52, a reflection mirror 53, and a relay system 54. The relay system 54 includes a relay lens 55, a reflection mirror 56, a relay lens 57, and a reflection mirror 58. The color separation system 50 separates illumination light having exited out of the optical integration system 30 into three color light fluxes or red (R) green (G), and blue (B) light fluxes and guides the color light fluxes to the liquid crystal light valves 61, 62, and 63, which are disposed in positions in the optical path downstream of the color separation system 50.

The first dichroic mirror 51 receives the three color light fluxes or the R, G, and B light fluxes and is characterized in that it transmits the R light and reflects the G light and the B light. The second dichroic mirror 52 receives the G light and the B light reflected off the first dichroic mirror 51 and is characterized in that it reflects the G light and transmits the B light.

The R light having passed through the first dichroic mirror 51 is incident on the liquid crystal light valve 61 via the reflection mirror 53. The G light reflected off the first dichroic mirror 51 and further reflected off the second dichroic mirror 52 is incident on the liquid crystal light valve 62. The B light having passed through the second dichroic mirror 52 travels via the relay lens 55, the reflection mirror 56, the relay lens 57, and the reflection mirror 58 and is incident on the liquid crystal light valve 63.

Each of the liquid crystal light valves 61, 62, and modulates the spatial intensity distribution of the illumination light incident thereon based on an image signal that is input information. The three color light fluxes incident on liquid crystal panels of the liquid crystal light valves 61, 62, and 63 are adjusted in terms of the polarization state on a pixel basis. The liquid crystal light valves 61, 62, and 63 form corresponding color modulated light fluxes, that is, image light fluxes.

Each of the liquid crystal light valves 61, 62, and 63 includes a liquid crystal panel and a pair of polarizers that sandwich the liquid crystal panel. The liquid crystal panel has a liquid crystal layer that may operate, for example, in a vertical alignment (VA) mode, a twisted nematic (TN) mode, or a transverse electric field mode, and the mode is not limited to a specific mode. In the present embodiment, the mode is assumed to be the VA mode. A field lens may be provided on the light incident side of each of the liquid crystal panels.

The cross dichroic prism 64 combines the color image light fluxes outputted from the liquid crystal light valves 61, 62, and 63 with one another and outputs the combined light to the projection system 70. The cross dichroic prism 64 is formed by bonding four rectangular prisms to each other. A first dielectric multilayer film and a second dielectric multilayer film that intersect each other in an X-like shape are formed on the interfaces between the bonded rectangular prisms. In the cross dichroic prism 64, the R light from the liquid crystal light valve 61 is reflected off the first dielectric multilayer film and directed toward the projection system 70, and the B light from the liquid crystal light valve 63 is reflected off the second dielectric multilayer film and directed toward the projection system 70. The cross dichroic prism 64 allows the G light from the liquid crystal light valve 62 to pass therethrough straightforward and exit out thereof. The cross dichroic prism 64 thus combines the R light, the G light, and the B light into combined light that is image light that forms a color image.

The projection system 70 enlarges the image light formed of the combined light formed by the cross dichroic prism 64 at a desired magnification factor and projects a color image on a screen (not shown).

The lighting state detector 41 receives detected lamp voltages (inter-electrode voltages) in the four light sources 10a, 10b, 10c, and 10d detected by the light source controllers 110 and detects the lighting states of the four light sources 10a, 10b, 10c, and 10d, that is, which light source is currently light-on state that light source emits light and which light source is currently light-off state that light source does not emit light. The lighting state detector 41 may instead detect the light-on state and the light-off state by evaluating whether each of the light sources is not driven, for example, because it has reached its life or it has become defective or by evaluating whether or not light source drive information, such as the amount of light, the luminance of light, the voltage in the light source, or the current in the light source, exceeds a predetermined threshold.

The storage section 42 stores correction information related to a VT characteristic based on a viewing angle characteristic of each of the liquid crystal light valves 61, 62, and 63 and other types of information. The correction information will be described later. The controller 45 performs gamma correction on an image signal (input information) by using the correction information based on the viewing angle characteristic of each of the liquid crystal light valves 61, 62, and 63 in accordance with the lighting states of the four light sources 10a, 10b, 10c, and 10d that are detected by the lighting state detector 41.

Figure 3:
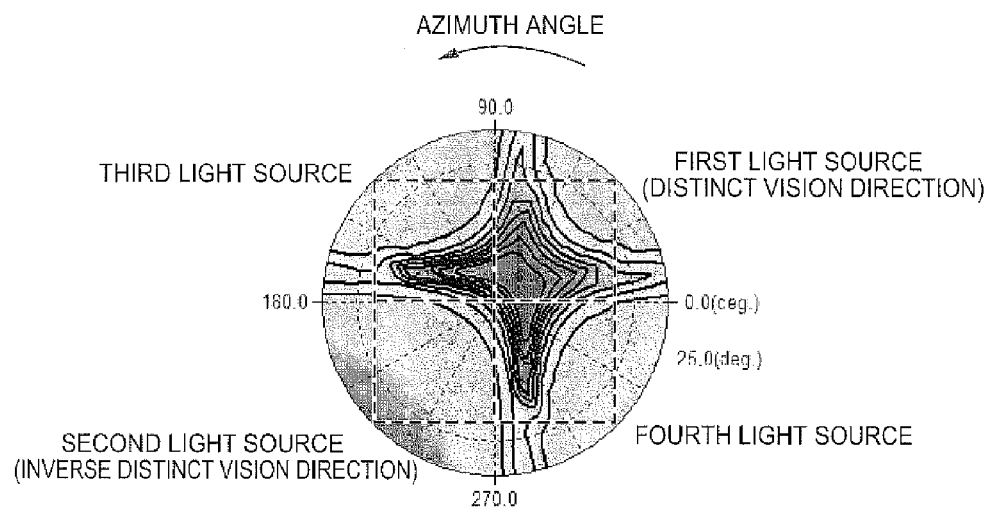
FIG. 3 shows a viewing angle characteristic of a liquid crystal panel.

FIG. 3 shows a viewing angle characteristic that affects the contrast of each of the liquid crystal panels in the present embodiment.

For example, when a VA-mode liquid crystal panel is used as each of the liquid crystal panels in the present embodiment, the liquid crystal molecules are pre-tilted for restriction of the direction in which the liquid crystal molecules are inclined when an electric field is applied thereto. The pre-tilted liquid crystal molecules cause the VA-mode liquid crystal panel to show an asymmetric viewing angle characteristic, such as that shown in FIG. 3. The curves in FIG. 3 represent iso-contrast curves. A contrast curve closer to the center represents higher contrast, and a contrast curve closer to the periphery represents lower contrast. In this example, an area where the contrast is maximized is shifted from the center, that is, a polar angle (angle of incidence) of 0° in the direction of an azimuth angle of 45°. In other words, a wide high-contrast area is present in the direction of the azimuth angle of 45°. Conversely, a narrow high-contrast area is present in the direction of an azimuth angle of 225°. Therefore, the 45-degree direction is a distinct vision direction, and the 225-degree direction is an inverse distinct vision direction.

The light fluxes 11a to 11d incident on the different sub-areas of the first optical integration lens 31 as shown in FIG. 2B are collected by the second optical integration lens 32 and the superimposing lens 34 and superimposed on one another in the same area of each of the liquid crystal light valves 61, 62, and 63. As a result, the angles of incidence (azimuth angles) of the light fluxes emitted from the light sources 10a, 10b, 10c, and 10d and incident on the liquid crystal light valves 61, 62, and 63 differ from each other. In the case of the projector 100, since a viewer does not directly view the liquid crystal panels, it can be assumed that the viewing angle characteristic of each of the liquid crystal panels is not a contrast characteristic of the liquid crystal panel in the direction in which the viewer looks at the liquid crystal panel but is a contrast characteristic of the liquid crystal panel in the direction of the light incident thereon.

As shown in FIG. 3, among the four light sources 10a, 10b, 10c, and 10d, a light source that emits light to be incident on the liquid crystal panels primarily in an azimuth angle direction corresponding to the distinct vision direction (azimuth angle of 45°) is referred to as a first light source, and a light source that emits light to be incident on the liquid crystal panels primarily in an azimuth angle direction corresponding to the inverse distinct vision direction (azimuth angle of 225°) is referred to as a second light source. Further, a light source that emits light to be incident on the liquid crystal panels primarily in an azimuth angle direction corresponding to an azimuth angle of 135° is referred to as a third light source, and a light source that emits light to be incident on the liquid crystal panels primarily in an azimuth angle direction corresponding to an azimuth angle of 315° is referred to as a fourth light source. The relationship representing the correspondence of the first to fourth light sources to the light sources 10a to 10d varies as appropriate depending, for example, on the properties, the number, and the arrangement of optical parts that guide the light fluxes from the light sources 10a to 10d to the liquid crystal light valves 61, 62, and 63.

FIGS. 4 to 9 show results of a simulation conducted by the present inventors and show an applied voltage-light amount characteristic (V-T characteristic) of each of the liquid crystal panels based on the viewing angle characteristic thereof described above in different lighting states of the light sources. The amount of light represents the amount of leakage light that leaks when the liquid crystal panel is driven in a black-display mode. In FIGS. 4 to 9, the amount of light is normalized as appropriate for ease of comparison of changes in the amount of leakage light at voltages in a variety of lighting states, and the actual amount of light increases or decreases in accordance with the lighting states of the light sources.

Figure 4:
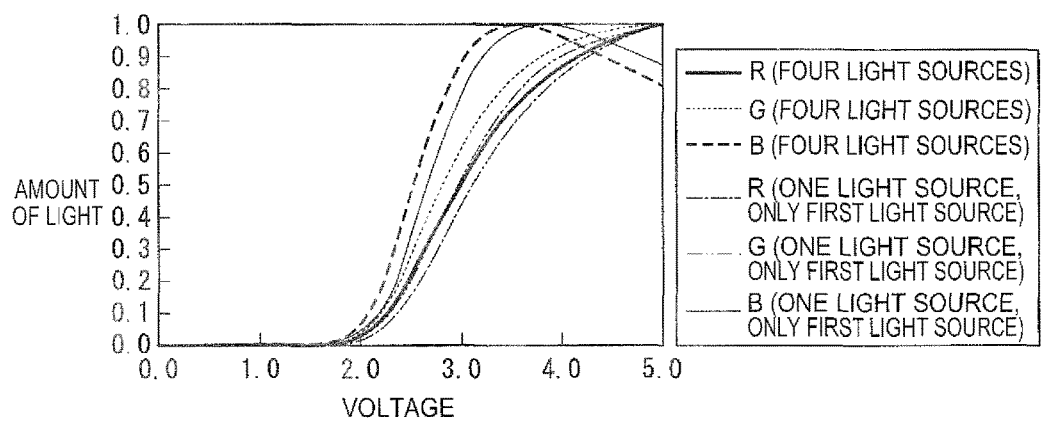
FIG. 4 shows a V-T characteristic in a case where a first light source is light-on state.
Figure 5:
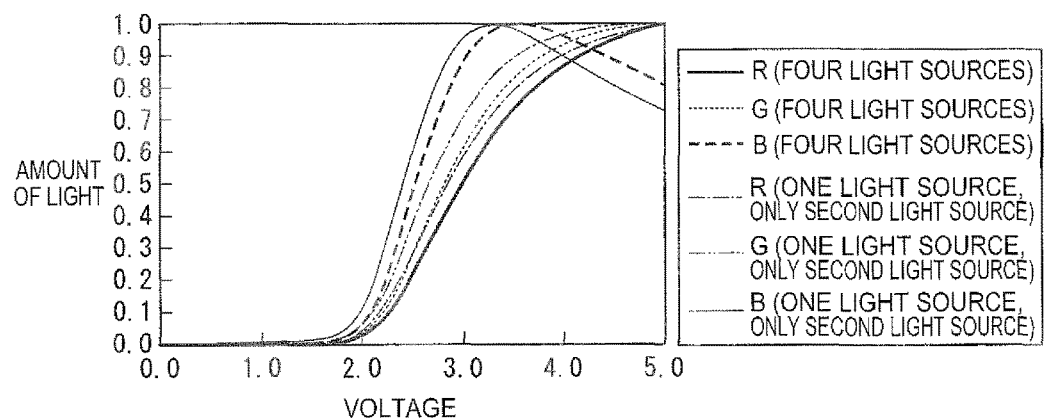
FIG. 5 shows the V-T characteristic in a case where a second light source is light-on state.
Figure 6:
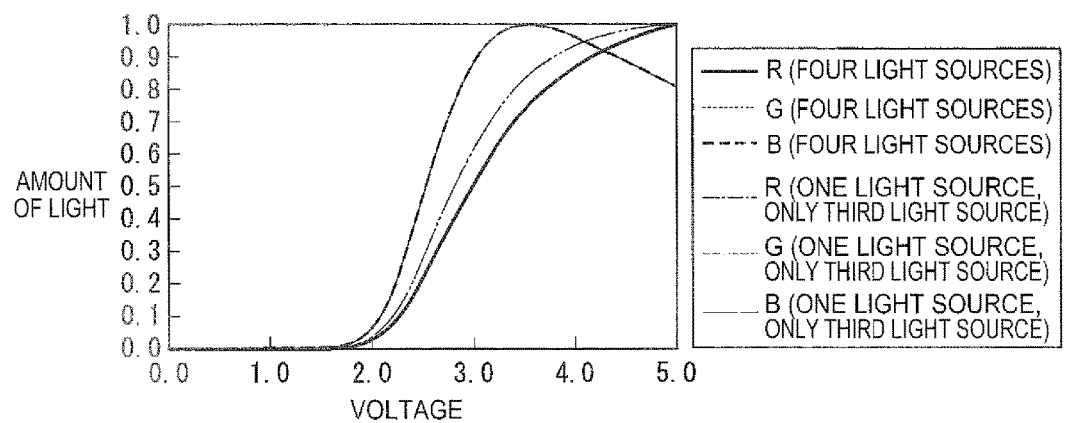
FIG. 6 shows the V-T characteristic in a case where a third light source is light-on state.
Figure 7:
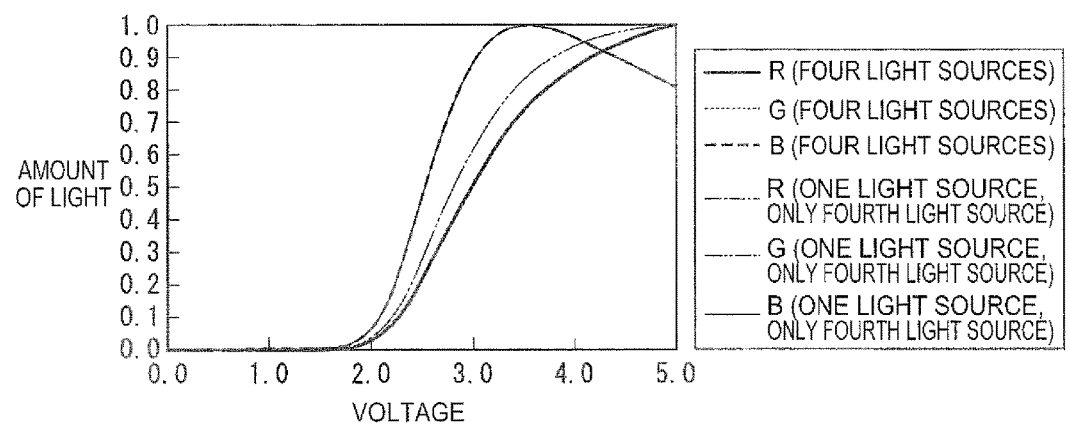
FIG. 7 shows the V-T characteristic in a case where a fourth light source is light-on state.
Figure 8:
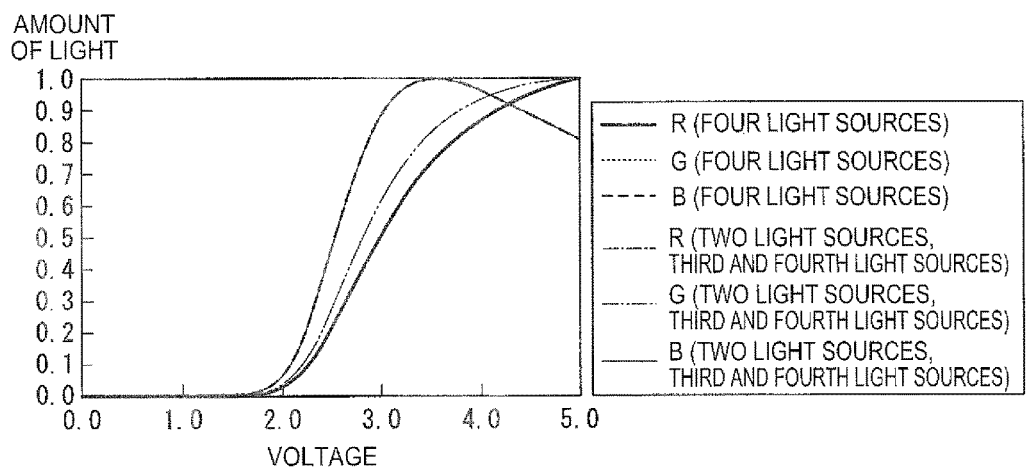
FIG. 8 shows the V-T characteristic in a case where the third and fourth light sources are light-on state.
Figure 9:
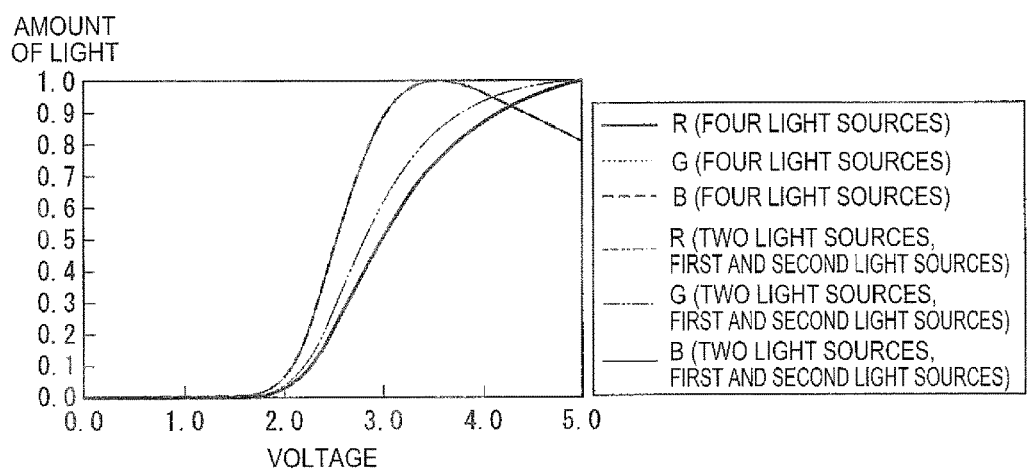
FIG. 9 shows the V-T characteristic in a case where the first and second light sources are light-on state.

FIG. 4 shows the V-T characteristic in a case where only the first light source is light-on state. FIG. 5 shows the V-T characteristic in a case where only the second light source is light-on state. FIG. 6 shows the V-T characteristic in a case where only the third light source is light-on state. FIG. 7 shows the V-T characteristic in a case where only the fourth light source is light-on state. FIG. 8 shows the V-T characteristic in a case where two of the four light sources or the third and fourth light sources are light-on state. FIG. 9 shows the V-T characteristic in a case where two of the four light sources or the first and second light sources are light-on state.

FIGS. 4 to 9 show the V-T characteristics in the cases where only part of the light sources is light-on state as well as the V-T characteristic in a case where all the four light sources are light-on state as a comparative example. Since the liquid crystal panels corresponding to the colors R, G, and B have different V-T characteristics, the V-T characteristics shown in FIGS. 4 to 9 are drawn in an RGB color basis.

As shown in FIG. 4, when only the first light source, which is light-on state to be incident in the azimuth angle direction corresponding to the distinct vision direction, is light-on state, the V-T curves are shifted toward a side where the amount of light decreases (downward in FIG. 4) with respect to the four-light-source case where all the four light sources are light-on state. On the other hand, when only the second light source, which emits light to be incident in the azimuth angle direction corresponding to the inverse distinct vision direction, is light-on state, the V-T curves are shifted toward a side where the amount of light increases (upward in FIG. 5) with respect to the four-light-source case, where all the four light sources are light-on state, as shown in FIG. 5.

Further, as shown in FIGS. 6 to 9, when only the third light source is light-on state, when only the fourth light source is light-on state, when two light sources or the first and second light sources are light-on state, or when two light sources or the third and fourth light sources are light-on state, the V-T curves are not shifted with respect to the four-light-source case, where all the four light sources are light-on state. For example, as shown in FIGS. 6 and 7, when only one light source, for example, only the third or fourth light source is light-on state, it is believed that the V-T curves are not shifted because the V-T characteristic in the first light source corresponding to the distinct vision direction and the V-T characteristic in the second light source corresponding to the inverse distinct vision direction are averaged. On other hand, as shown in FIG. 9, when two light sources or the first and second light sources are light-on state, it is believed that the V-T curves are not shifted because the increase in the amount of light in the case where only the first light source is light-on state and the decrease in the amount of light in the case where only the second light source is light-on state cancel each other.

In view of the results described above, acquiring the V-T curves in the case where only the first light source is light-on state light and the V-T curves in the case where only the second light source is light-on state as the correction information allows the controller 45 to perform gamma correction according to any of the lighting state patterns based on the acquired correction information. The V-T curves as the correction information are stored in the storage section 42, for example, in the form of a lookup table. The controller 45 reads the correction information related to the V-T curves from the storage section 45 and calculates the V-T characteristic in an arbitrary light-source-on state as required. The controller 45 can thus perform optimum gamma correction in accordance with the lighting states of the light sources.

In the present embodiment, correction information in the case where the first light source is light-on state light is called first correction information, and correction information in the case where the second light source is light-on state light is called second correction information. Further, each of the first correction information and the second correction information is based on at least one of the correction information in the case where only the first light source is light-on state and the correction information in the case where only the second light source is light-on state.

Figure 10:
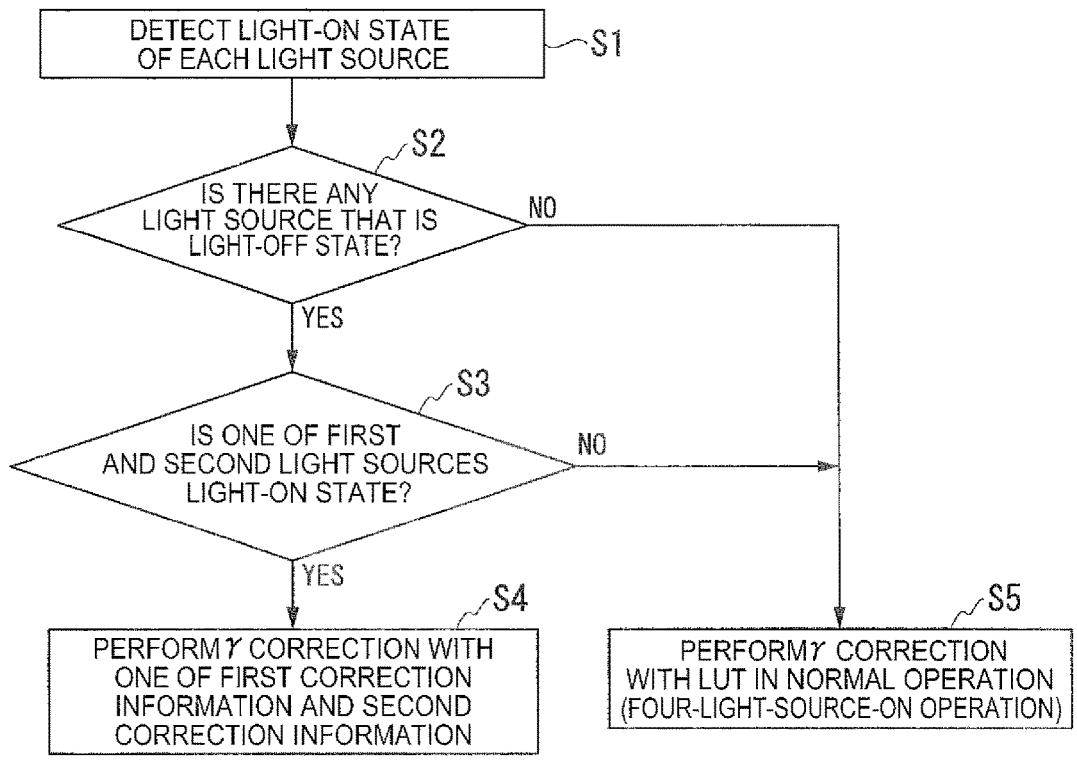
FIG. 10 is a flowchart of gamma correction performed by a controller.

FIG. 10 is a flowchart showing the procedure of the control performed by the controller 45.

The controller 45 first detects the lighting states of the four light sources 10a, 10b, 10c, and 10d that are detected by the lighting state detector 41, that is, which light source is currently light-on state that light source emits light and which light source is currently light-off state that light source does not emit light (step S1).

The controller 45 then evaluates whether or not there is a light source that is currently light-off state based on the result of the detection from the lighting state detector 41 (step S2).

When a result of the evaluation shows that there is a light source that is light-off state (YES in step S2), the controller 45 evaluates whether or not the first light source or the second light source is light-on state (step S3).

When one of the first light source and the second light source is light-on state (YES in step S3), the controller 45 uses one of the first correction information in the case where the first light source is light-on state and the second correction information in the case where the second light source is light-on state, that is, the relevant one of the first correction information and the second correction information to perform gamma correction on an image signal (step S4).

For example, when only one of the four light sources, for example, only the first light source is light-on state, that is, the first light source out of the first and second light sources is light-on state, the controller 45 uses the correction information in the case where only the first light source is light-on state as the first correction information to correct input information. Further, when two of the four light sources, for example, the second and third light sources are light-on state, that is, the second light source out of the first and second light sources is light-on state, the controller 45 calculates correction information as the second correction information based on the correction information in the case where only the first light source is light-on state and the correction information in the case where only the second light source is light-on state and uses the calculated second correction information to perform gamma correction on an image signal (input information).

On the other hand, when there is no light source that is light-off state in step S2 (NO in step S2), the controller 45 uses correction information in normal lighting operation, that is, in the four-light-source case where all the four light sources are light-on state to perform gamma correction on an image signal (input information) (step S5).

In this process, correction information (lookup table) in the four-light-source-on operation calculated in advance and stored in the storage section 42 may instead be acquired, and the correction may be performed by using the stored correction information. Still instead, the correction information in the case where only the first light source is light-on state and the correction information in the case where only the second light source is light-on state light may be stored in the storage section 42 in advance and may then be acquired, and correction information calculated based on the stored correction information may be used to perform gamma correction on an image signal (input information).

In step S3, when one of the first and second light sources is not light-on state, that is, when both the first and second light sources are light-on state or neither the first nor second light source are light-on state (NO in step S3), the controller 45 uses the correction information in the normal lighting operation to perform gamma correction on an image signal (step S5).

For example, when three of the four light sources, for example, the first, second, and fourth light sources are light-on state, that is, when both the first and second light sources are light-on state, the controller 45 uses the correction information in the case where all the four light sources are light-on state to correct input information. Instead, the controller 45 uses correction information calculated based on the correction information in the case where only the first light source is light-on state and the correction information in the case where only the second light source is light-on state to perform gamma correction on an image signal (input information).

The procedure described above is repeated afterward.

The detection of the lighting state of each of the light sources in step S1 may be performed, for example, at fixed time intervals.

In the projector 100 according to the present embodiment, the controller 45 uses correction information based on the viewing angle characteristics of the liquid crystal light valves 61, 62, and 63 to perform gamma correction on an image signal in accordance with the lighting states of the four light sources 10a, 10b, 10c, and 10d that are detected by the lighting state detector 41. The amount of color unevenness and illuminance unevenness that occur in related art when only part of the four light sources 10a, 10b, 10c, and 10d is light-on state can thus be reduced.

In the present embodiment, in particular, acquiring the V-T curves in the case where only the first light source is light-on state and the V-T curves in the case where only the second light source is light-on state as the correction information allows gamma correction according to any of the lighting state patterns based on the acquired correction information. Therefore, the amount of effort and the length of time required to acquire data before the projector 100 is shipped can be reduced, and the amount of data stored in the projector 100 and the amount of calculation of the V-T characteristics can be reduced.

Second Embodiment

A second embodiment of the invention will be described below with reference to FIGS. 1, 2A, and 2E and FIGS. 11 to 14.

In the present embodiment, a projector including four light sources and using a liquid crystal light valve as a light modulator or what is called a four-light-source liquid crystal projector is presented by way of example, as in the first embodiment.

The description of FIGS. 1 to 2B is the same as that in the first embodiment described above and will therefore be omitted.

In the present embodiment, the storage section 42 stores correction information based on the viewing angle characteristics of the liquid crystal light valves 61, 62, and 63 and other types of information. The correction information will be described later. The correction information is stored in the storage section 42, for example, in the form of a lookup table. The controller 45 uses correction information based on the viewing angle characteristics of the liquid crystal light valves 61, 62, and 63 to perform contrast correction on an image signal (input information) in accordance with the lighting states of the four light sources 10a, 10b, 10c, and 10d that are detected by the lighting state detector 41.

Figure 11:
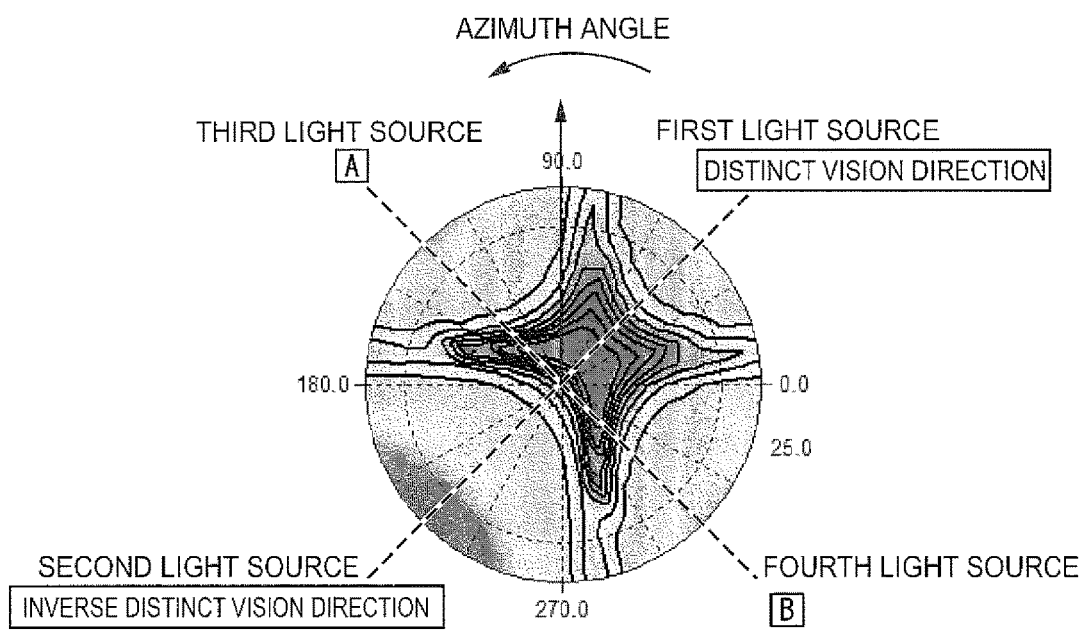
FIG. 11 shows a viewing angle characteristic of a liquid crystal panel.

FIG. 11 shows a viewing angle characteristic that affects the contrast of each of the liquid crystal panels in the present embodiment.

For example, when a VA-mode liquid crystal panel is used as each of the liquid crystal panels in the present embodiment, the liquid crystal molecules are pre-tilted for restriction of the direction in which the liquid crystal molecules are inclined when an electric field is applied thereto. The pre-tilted liquid crystal molecules cause the VA-mode liquid crystal panel to show an asymmetric viewing angle characteristic, such as that shown in FIG. 11. The curves in FIG. 11 represent iso-contrast curves. A contrast curve closer to the center represents higher contrast, and a contrast curve closer to the periphery represents lower contrast. In this example, an area where the contrast is maximized is shifted from the center, that is, a polar angle (angle of incidence) of 0° in the direction of an azimuth angle of 45°. In other words, a wide high-contrast area is present in the direction of the azimuth angle of 45°. Conversely, a narrow high-contrast area is present in the direction of an azimuth angle of 225°. Therefore, in this case, the 45-degree direction is the distinct vision direction, and the 225-degree direction is the inverse distinct vision direction.

The light fluxes 11a to 11d incident on the different sub-areas of the first optical integration lens 31 are collected by the second optical integration lens 32 and the superimposing lens 34 and superimposed on one another in the same area of each of the liquid crystal light valves 61, 62, and 63, as shown in FIG. 23. As a result, the angles of incidence (azimuth angles) of the light fluxes emitted from the light sources 10a, 10b, 10c, and 10d and incident on the liquid crystal light valves 61, 62, and 63 differ from each other. In the case of the projector 100, since a viewer does not directly view the liquid crystal panels, it can be assumed that the viewing angle characteristic of each of the liquid crystal panels is not the contrast characteristic of the liquid crystal panel in the direction in which the viewer looks at the liquid crystal panel but is the contrast characteristic of the liquid crystal panel in the direction of the light incident thereon.

In FIG. 11, among the four light sources 10a, 10b, 10c, and 10d, a light source that emits light to be incident on the liquid crystal panels primarily in the azimuth angle direction corresponding to the distinct vision direction (azimuth angle of 45°) is referred to as a first light source, and a light source that emits light to be incident on the liquid crystal panels primarily in the azimuth angle direction corresponding to the inverse distinct vision direction (azimuth angle of 225°) is referred to as a second light source, as in the first embodiment described above. Further, a light source that emits light to be incident on the liquid crystal panels primarily in the azimuth angle direction corresponding to an azimuth angle of 135° is referred to as a third light source, and a light source that emits light to be incident on the liquid crystal panels primarily in the azimuth angle direction corresponding to an azimuth angle of 315° is referred to as a fourth light source. The relationship representing the correspondence of the first to fourth light sources to the light sources 10a to 10d varies as appropriate depending, for example, on the properties, the number, and the arrangement of optical parts that guide the light fluxes from the light sources 10a to 10d to the liquid crystal light valves 61, 62, and 63.

Figure 12:
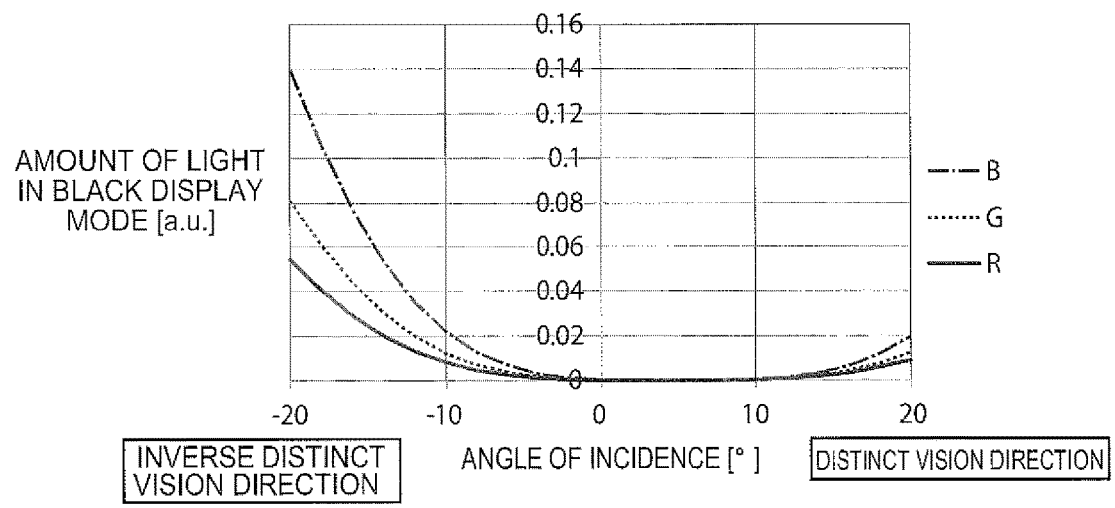
FIG. 12 shows the amounts of leakage light in a black display mode in the direction along a distinct vision direction and an inverse distinct vision direction.
Figure 13:
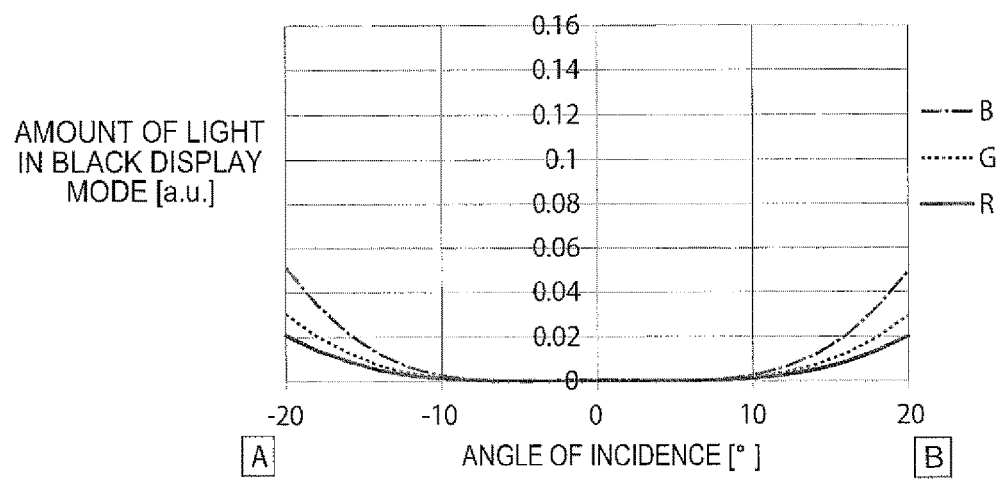
FIG. 13 shows the amounts of leakage light in the black display mode in the directions perpendicular to the distinct vision direction and the inverse distinct vision direction.

FIGS. 12 and 13 show results of a simulation conducted by the present inventors and show the relationship between the angle of incidence of the light incident on the liquid crystal panels and the amount of leakage light in the liquid crystal panels in a predetermined azimuth angle direction in the black display mode based on the viewing angle characteristics described above.

FIG. 12 shows the amount of leakage light in the liquid crystal panels in the black display mode in the directions along the distinct vision direction and the inverse distinct vision direction (45°-225°), and FIG. 13 shows the amount of leakage light in the liquid crystal panels in the black display mode in directions A-B (135°-315°) perpendicular to the distinct vision direction and the inverse distinct vision direction.

In FIGS. 12 and 13, the horizontal axis represents the angle of incidence of the light (polar angle) [°], and the vertical axis represents the amount of leakage light [arbitrary unit] in the black display mode.

In the following description, the "amount of leakage light in the black display mode" is simply referred to as the "amount of leakage light."

As shown in FIGS. 12 and 13, the amounts of RGB leakage light differ from each other due, for example, to an effect of wavelength dispersion in the liquid crystal molecules. Further, the amount of leakage light in the inverse distinct vision direction is relatively greater than the amount of leakage light in the distinct vision direction. The amounts of leakage light in the directions perpendicular to the distinct vision direction and the inverse distinct vision direction (135°-315°: direction A-B) have intermediate values between the amount of leakage light in the inverse distinct vision direction and the amount of leakage light in the distinct vision direction. However, comparison of the amounts of leakage light, for example, at polar angles of ±10° with each other shows that the amounts of leakage light in the distinct vision direction and the directions A and B are substantially zero, whereas the amount of leakage light in the inverse distinct vision direction ranges from about 0.01 to 0.02. That is, among the four directions described above, the amount of leakage light in the inverse distinct vision direction is relatively greater than the amounts of leakage light in the other three directions.

In view of the findings described above, in the present embodiment, when the second light source, which emits light to be incident primarily in the azimuth angle direction corresponding to the inverse distinct vision direction, is light-on state among the four light sources, an image signal (input information) is so corrected that the amount of leakage light of a color light flux having a relatively small amount of leakage light, for example, the amount of leakage R light and the amount of leakage G light, approaches the amount of leakage light of a color light flux having a relatively large amount of leakage light, for example, the amount of leakage B light. Specifically, information on the angle of incidence and the amount of leakage light related to each other based on the viewing angle characteristics of the liquid crystal panels is stored as the correction information in the storage section 42, and the controller 45 uses the correction information read from the storage section 42 to correct input information.

In the present embodiment, it is assumed that the amounts of leakage color light fluxes in the case where only the second light source is light-on state is third correction information, and the amounts of leakage color light fluxes in the case where only the third light source or only the fourth light source is light-on state is fourth correction information. The third correction information and the fourth correction information are stored in the storage section 42.

Figure 14:
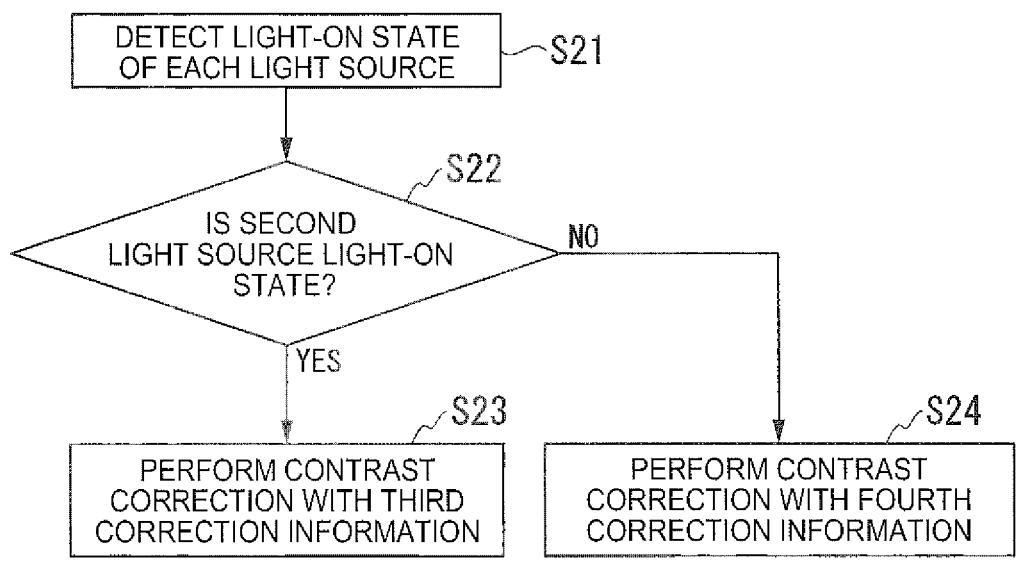
FIG. 14 is a flowchart of contrast correction performed by the controller.

FIG. 14 is a flowchart showing the procedure of the control performed by the controller 45.

The controller 45 first detects the lighting states of the four light sources 10a, 10b, 10c, and 10d that are detected by the lighting state detector 41, that is, which light source is currently light-on state that light source emits light and which light source is currently light-off state that light source does not emit light (step S21).

The controller 45 then evaluates whether or not the second light source is light-on state based on the result of the detection from the lighting state detector 41 (step S22).

When the second light source is light-on state (YES in step S22), the controller 45 uses the correction information in the case where only the second light source is light-on state (third correction information) to correct an image signal (input information) (step S23).

For example, among the four light sources, when all the four light sources or the first to fourth light sources are light-on state, that is, when the second light source is light-on state, the controller 45 uses the correction information in the case where only the second light source is light-on state as the third correction information to perform contrast correction on input information. The same holds true for a lighting state in which three of the four light sources, for example, the second, third, and fourth light sources are light-on state, a lighting state in which two of the four light sources, for example, the first and second light sources are light-on state, and other lighting states.

On the other hand, when the second light source is light-off state in step S22 (NO in step S22), the controller 45 uses the correction information in the case where only the third light source or only the fourth light source is light-on state (fourth correction information) to perform contrast correction on an image signal (step S24). As shown in FIGS. 12 and 13, the differences among the amounts of leakage color light fluxes in the case where only the third light source or only the fourth light source is light-on state are not as large as the differences among the amounts of leakage color light fluxes in the case where only the second light source, which emits light in the azimuth angle direction corresponding to the inverse distinct vision direction, light-on state, but performing contract correction using the fourth correction information can prevent color unevenness from occurring.

The procedure described above is repeated afterward.

The detection of the lighting state of each of the light sources in step S21 may be performed, for example, at fixed time intervals.

In the projector 100 according to the present embodiment, the controller 45 uses correction information based on the viewing angle characteristics of the liquid crystal light valves 61, 62, and 63 to perform contrast correction on an image signal in accordance with the lighting states of the four light sources 10a, 10b, 10c, and 10d that are detected by the lighting state detector 41. The amount of color unevenness and illuminance unevenness that occur in related art when only part of the four light sources 10a, 10b, 10c, and 10d is light-on state can thus be reduced.

In the present embodiment, in particular, reliably performing contrast correction when the second light source is light-on state can suppress color unevenness, which most affects display quality. The burden of the contrast correction on the projector 100 can therefore be minimized.

The technical range of the invention is not limited to the embodiments described above, and a variety of changes can be made thereto to the extent that the changes do not depart from the substance of the invention.

For example, in the first and second embodiments described above, the projector including four light sources is presented by way of example, but the number of light sources is not limited to four and can be changed as appropriate. Further, the viewing angle characteristic in the VA mode is presented as the viewing angle characteristic of each of the liquid crystal panels by way of example, but a liquid crystal panel that operates in the TN mode, the transverse electric field mode, and any other mode may be used. Since the viewing angle characteristic changes in accordance with the operating mode, the V-T characteristic or information on the amount of leakage light in a case where light sources corresponding, for example, to the distinct vision direction and the inverse distinct vision direction is light-on state may be acquired in accordance with the viewing angle characteristics in the operating mode.

In the second embodiment described above, when the second light source is light-off state, the controller 45 uses the fourth correction information in the case where only the third light source or only the fourth light source is light-on state to perform contrast correction, but the contrast correction is not necessarily performed this way. For example, when only the first light source, which emits light in the azimuth angle direction corresponding to the distinct vision direction, is light-on state, fifth correction information in the case where only the first light source is light-on state may be used to perform the contrast correction. Further, when the second light source is light-off state, the controller 45 may perform no contrast correction instead of performing contrast correction by using the fourth or fifth correction information.

In the second embodiment described above, any one of the third correction information, the fourth correction information, and the fifth correction information is used to perform contrast correction, but the contrast correction is not necessarily performed this way. Correction information calculated based on two or more of the third correction information, the fourth correction information, and the fifth correction information may be used to perform the contrast correction in accordance with the lighting states.

In the above first and second embodiments, the description has been made of the case where the invention is applied to a transmissive projector, and the invention is also applicable to a reflective projector. The term "transmissive" used herein means that each of the liquid crystal light valves each including a liquid crystal panel and other components transmits light. The term "reflective" used herein means that each of the liquid crystal light valves reflects light. The light modulator is not limited, for example, to a liquid crystal panel and may, for example, be a light modulator using micromirrors.

In the first and second embodiments described above, the projector 100 using the three liquid crystal panels (liquid crystal light valves 61 to 63) is only presented by way of example, and the invention is also applicable to a projector using only one liquid crystal panel and a projector using four or more liquid crystal panels.

In addition, the number, arrangement, material, and other factors of the components of the projector are not limited to those in the embodiments described above and can be changed as appropriate.

The entire disclosure of Japanese Patent Application No. 2014-063239, filed Mar. 26, 2014 and 2014-063240, filed Mar. 26, 2014 are expressly incorporated by reference herein.

What is claimed is:

1. A projector comprising:
   a plurality of light sources;
   a light modulator that modulates light fluxes emitted from the plurality of light sources based on input information;
   a projection system that projects modulated light fluxes from the light modulator;
   a light guiding system that has different areas on which the plurality of light fluxes emitted from the plurality of light sources are incident and guides the plurality of incident light fluxes to the light modulator;
   a lighting state detector that detects lighting states of the plurality of light sources; and
   a controller that corrects the input information with correction information based on a viewing angle characteristic of the light modulator in accordance with the lighting states of the plurality of light sources detected by the lighting state detector, the correction information being determined from iso-contrast curves caused by different azimuth angles of incidence of the modulated light fluxes.

2. The projector according to claim 1,
   wherein the plurality of light sources include:
   a first light source that emits light incident on the light modulator in an azimuth angle direction corresponding to a distinct vision direction in the viewing angle characteristic, and
   a second light source that emits light incident on the light modulator in an azimuth angle direction corresponding to an inverse distinct vision direction in the viewing angle characteristic, and
   the correction information includes first correction information in a case where the first light source is light-on state and second correction information in a case where the second light source is light-on state.

3. The projector according to claim 2,
   wherein the controller performs the correction on the input information with one of the first correction information and the second correction information when one of the first light source and the second light source is light-on state.

4. The projector according to claim 2,
   wherein each of the first correction information and the second correction information is correction information based on at least one of correction information in a case where only the first light source is light-on state and correction information in a case where only the second light source is light-on state.

5. The projector according to claim 1,
   wherein the correction of the input information is gamma correction of the input information.

6. The projector according to claim 1,
   wherein the correction information includes correction information in a case where among the plurality of light sources, a light source that emits light incident in an azimuth angle direction corresponding to an inverse distinct vision direction in the viewing angle characteristic is light-on state.

7. The projector according to claim 6,
   wherein the light modulator is formed of a plurality of light modulators that modulate a plurality of color light fluxes having colors different from each other, and
   the controller performs the correction on the input information such that among the plurality of color light fluxes, the amount of leakage light of a color light flux having a first amount of leakage light in the light modulators in a black display mode approaches the amount of leakage light of a color light flux having a second amount of leakage light in the black display mode, wherein the first amount of leakage light is a small amount relative to the second amount of leakage light.

8. The projector according to claim 6,
   wherein the correction of the input information is contrast correction of the input information.

9. The projector according to claim 1,
   wherein the light modulator is a liquid crystal light valve.

10. A projector comprising:
    a plurality of light sources;
    a light modulator that modulates light fluxes emitted from the plurality of light sources based on input information;
    a projection system that projects modulated light fluxes from the light modulator;

a light guiding system that has different areas on which the plurality of light fluxes emitted from the plurality of light sources are incident and guides the plurality of incident light fluxes to the light modulator;
a lighting state detector that detects lighting states of the plurality of light sources; and
a controller that corrects the input information with correction information based on a viewing angle characteristic of the light modulator in accordance with the lighting states of the plurality of light sources detected by the lighting state detector, the correction information excluding correction information individually corresponding to all combinations of the lighting states of the plurality of the light sources, the controller performs correcting based on a lighting state of a second light source configured to emit light incident on the light modulator in an azimuth angle direction corresponding to an inverse distinct vision in the viewing angle characteristic.

* * * * *